(12) United States Patent
Cho et al.

(10) Patent No.: US 8,257,059 B2
(45) Date of Patent: Sep. 4, 2012

(54) AIR SUPPLY SYSTEM FOR A VEHICLE

(75) Inventors: Kyungseok Cho, Daejeon-si (KR);
Woojune Kim, Daejeon-si (KR);
Changhoon Oh, Daejeon-si (KR)

(73) Assignee: Halla Climate Control Corporation, Daejeon-Si (KR)

( * ) Notice: Subject to any disclaimer, the term of this patent is extended or adjusted under 35 U.S.C. 154(b) by 670 days.

(21) Appl. No.: 12/008,340

(22) Filed: Jan. 10, 2008

(65) Prior Publication Data

US 2008/0175708 A1    Jul. 24, 2008

(30) Foreign Application Priority Data

Jan. 18, 2007 (KR) .................. 10-2007-0005754
Dec. 24, 2007 (KR) .................. 10-2007-0136009

(51) Int. Cl.
*F04B 39/06* (2006.01)
*F04B 35/04* (2006.01)
(52) U.S. Cl. .................. 417/371; 417/353
(58) Field of Classification Search .............. 417/353, 417/423.12, 371, 366, 423.1, 423.7, 423.8, 417/423.14; 415/206; 60/607
See application file for complete search history.

(56) References Cited

U.S. PATENT DOCUMENTS

| | | | | |
|---|---|---|---|---|
| 2,829,286 A * | 4/1958 | Britz | ............... | 310/53 |
| 2,918,207 A * | 12/1959 | Moore | ............... | 417/373 |
| 4,364,717 A * | 12/1982 | Schippers et al. | ............ | 417/407 |
| 5,074,115 A * | 12/1991 | Kawamura | ............... | 60/608 |
| 5,121,605 A * | 6/1992 | Oda et al. | ............... | 60/608 |
| 5,363,674 A | 11/1994 | Powell | | |
| 5,605,045 A * | 2/1997 | Halimi et al. | ............... | 60/607 |
| 5,787,711 A * | 8/1998 | Woollenweber et al. | ....... | 60/597 |
| 5,857,332 A * | 1/1999 | Johnston et al. | ............... | 60/607 |
| 5,904,471 A * | 5/1999 | Woollenweber et al. | ..... | 417/371 |
| 6,032,466 A * | 3/2000 | Woollenweber et al. | ....... | 60/607 |
| 6,398,517 B1 * | 6/2002 | Choi | ............... | 417/243 |
| 6,449,950 B1 * | 9/2002 | Allen et al. | ............... | 60/607 |
| 6,571,558 B2 * | 6/2003 | Finger et al. | ............... | 60/605.1 |
| 6,739,845 B2 * | 5/2004 | Woollenweber | ............. | 417/407 |
| 2006/0073030 A1 | 4/2006 | McAuliffe et al. | | |
| 2006/0093500 A1 | 5/2006 | Liang | | |

FOREIGN PATENT DOCUMENTS

| | | |
|---|---|---|
| CN | 1281099 A | 1/2001 |
| GB | 701560 | 12/1953 |
| JP | 2006-207397 | 8/2006 |
| KR | 1998-17043 A | 7/1998 |

* cited by examiner

*Primary Examiner* — Charles Freay
*Assistant Examiner* — Alexander Comley
(74) *Attorney, Agent, or Firm* — Fulbright & Jaworski LLP

(57) ABSTRACT

The present invention relates to an air supply system for a vehicle, which includes a curved diffuser passageway and a volute formed on upper portion of the diffuser passageway to sufficiently secure a length of the diffuser passageway, thereby enhancing a pressure conversion efficiency and reducing a size of the entire system, and which further includes a guide for guiding an air flow toward an input of an impeller, thereby minimizing a loss occurring when air passing through a motor housing flows to the inlet of the impeller, and reducing a weight of an outlet duct.

8 Claims, 7 Drawing Sheets

Prior Art

Prior Art

AIR SUPPLY SYSTEM FOR A VEHICLE

This application claims priority from Korean Patent Application No: 10-2007-0136009 filed Dec. 24, 2007 and Korean Patent Application No: 10-2007-0005754 filed Jan. 18, 2007, incorporated herein by reference it their entireties.

BACKGROUND OF THE INVENTION

1. Field of the Invention

The present invention relates to an air supply system for vehicles, and more particularly, to an air supply system for a vehicle, which includes a curved diffuser passageway and a volute formed on upper portion of the diffuser passageway to sufficiently secure a length of the diffuser passageway, thereby enhancing a pressure conversion efficiency and reducing a size of the entire system. In addition, the present invention relates to an air supply system for vehicles, which further includes a guide for guiding an air flow toward an input of an impeller, thereby minimizing a loss occurring when air passing through a motor housing flows to the inlet of the impeller, and reducing a weight of an outlet duct.

2. Background Art

In general, vehicles have engines mounted for driving the vehicles, and are divided into gasoline vehicles, diesel vehicles, LPG vehicles, and so on according to kinds of fuel used to the engines. When the vehicle starts, a starting motor is driven by being supplied with electric power from a battery, rotates a flywheel fixed at an end of a crank shaft, and so, the crank shaft is also rotated and a connecting rod connected to the crank shaft performs a reciprocating motion to start the engine.

In the meantime, the diesel vehicle is equipped with an air supply system, which compresses air sucked into an engine and supplies the compressed air to an engine by running a turbine with energy of exhaust gas to thereby enhance output of the engine.

As shown in FIG. 1, the air supply system 1 includes: a turbine part 2 and a compression part 3 mounted integrally on the same axis; a bearing housing 4 located between the turbine part 2 and the compression part 3a; a rotary shaft 5 supported on the bearing housing 4; a turbine wheel 6 of the turbine part 2 mounted on an end portion of the rotary shaft 5; and an impeller 7 of the compression part 3 mounted on the other end portion of the rotary shaft 5. When the exhaust gas discharged from the engine rotates the turbine wheel 6 while passing through the turbine part 2, the impeller 7 of the compression part 3 is simultaneously rotated to compress sucked air, so that the compressed air is supplied into a cylinder of the engine to thereby enhance output of the engine through enhancement of a volume efficiency.

However, in case where the turbine wheel 6 is run by the exhaust gas of the engine, the air supply system 1 generates noise and vibration severely by the pulsation of the exhaust gas of the engine.

In addition, the fuel cell vehicle cannot use the air supply system 1, which uses exhaust gas as energy, as described above since it cannot use exhaust gas. So, the fuel cell vehicle has additional driving motor to operate an air supply system.

For your reference, the fuel cell consists of a number of cells stacked up (called "stack"). The fuel cell is a battery system for generating electricity and heat by progressing electrochemical reaction by electrolysis inverse reaction when fuel (hydrogen gas) and air (oxygen) is supplied to the stack, and so, in fact, may be called "power generating system".

Here, the air supplied to the stack is supplied through the air supply system 10 operated by the motor. FIG. 2 illustrates an air supply system 10 for such fuel cell vehicles. Now, the air supply system 10 for the fuel cell vehicles will be described in brief. The air supply system 10 includes: a motor part 11 having a rotary shaft 12 mounted at the center thereof and a stator 13 mounted on the periphery of the rotary shaft 12 to rotate the rotary shaft 12; a motor housing 15 accommodating the motor part 11 therein; an impeller 16 coupled to an end portion of the rotary shaft 12 to compress air; a compression housing 17 coupled to the front of the motor housing 15 for accommodating the impeller 16, the compression housing 17 adopted to compress the air sucked through an inlet 17a and discharge the compressed air to a volute 17b when the impeller 16 is rotated; and a bearing housing 18 coupled to the rear of the motor housing 15 for rotatably supporting the other end portion of the rotary shaft 12.

Furthermore, a magnet (not shown) is mounted inside the rotary shaft 12.

So, when the rotary shaft 12 is rotated by running the motor part 11, the impeller 16 mounted inside the compression housing 17 is simultaneously rotated, whereby air is sucked through the inlet 17a of the compression housing 17. The sucked air obtains kinetic energy while passing through the impeller 16, and converts the kinetic energy into pressure while passing through a diffuser passageway 17c of the compression housing 17. The pressure is concentrated on the volute 17b, and in this instance, the inside pressure of the volute 17b increases, and the air having the increased pressure is supplied to the stack.

In the meantime, the compression housing 17 and the bearing housing 18 have ball bearings 14 adapted to rotatably support the rotary shaft 12.

However, in the air supply system 10 according to the prior art, when the diffuser passageway 17c extends in a radial direction to enhance the pressure conversion performance, the entire size of the system is also increased, and the system size is restricted due to the characteristic of parts for vehicles, which have small installation spaces. Finally, the air supply system 10 according to the prior art has a problem in that it cannot secure a sufficient length of the diffuser passageway 17c, and so, is restricted in enhancing the pressure conversion performance.

SUMMARY OF THE INVENTION

Accordingly, the present invention has been made to solve the above-mentioned problems occurring in the prior arts, and it is an object of the present invention to provide an air supply system for vehicles, which includes a curved diffuser passageway and a volute formed on the upper portion of the diffuser passageway to sufficiently secure a length of the diffuser passageway, thereby enhancing a pressure conversion efficiency and reducing a size of the entire system.

It is another object of the present invention to provide an air supply system for vehicles, which further includes a guide for guiding an air flow toward an input of an impeller, thereby minimizing a loss occurring when air passing through a motor housing flows to the inlet of the impeller, and reducing a weight of an outlet duct.

To accomplish the above object, according to the present invention, there is provided an air supply system for vehicles comprising: a motor part adapted to rotate a rotary shaft mounted at the center thereof; a motor housing adapted to receive the motor part vertically inserted and mounted to the center thereof and having an air flow channel vertically formed on the outer periphery of the motor part; an inlet duct coupled to the upper end of the motor housing for guiding air introduced through an inlet thereof to the air flow channel of the motor housing; an impeller coupled to the lower end of the rotary shaft for compressing the air while rotating together with the rotary shaft; and an outlet duct coupled to the lower end of the motor housing for compressing the air passing through the air flow channel of the motor housing by the impeller and discharging the compressed air to an outlet thereof, wherein the outlet duct comprises: an impeller receiving portion formed on the inner lower end thereof for rotatably receiving the impeller therein and communicating with the air flow channel; a diffuser passageway adapted for converting kinetic energy of the air blown through the impeller into pressure, the diffuser passageway having a first passageway extending in a radial direction of the impeller receiving portion and a second passageway extending from the first passageway in an axial direction of the rotary shaft; and a volute communicatingly formed on the upper portion of the diffuser passageway for collecting air compressed while passing through the diffuser passageway and sending the collected air toward the outlet.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will be now made in detail to the preferred embodiment of the present invention with reference to the attached drawings.

Repeated descriptions of the same structure and operation as the prior art will be omitted.

Figure 1:
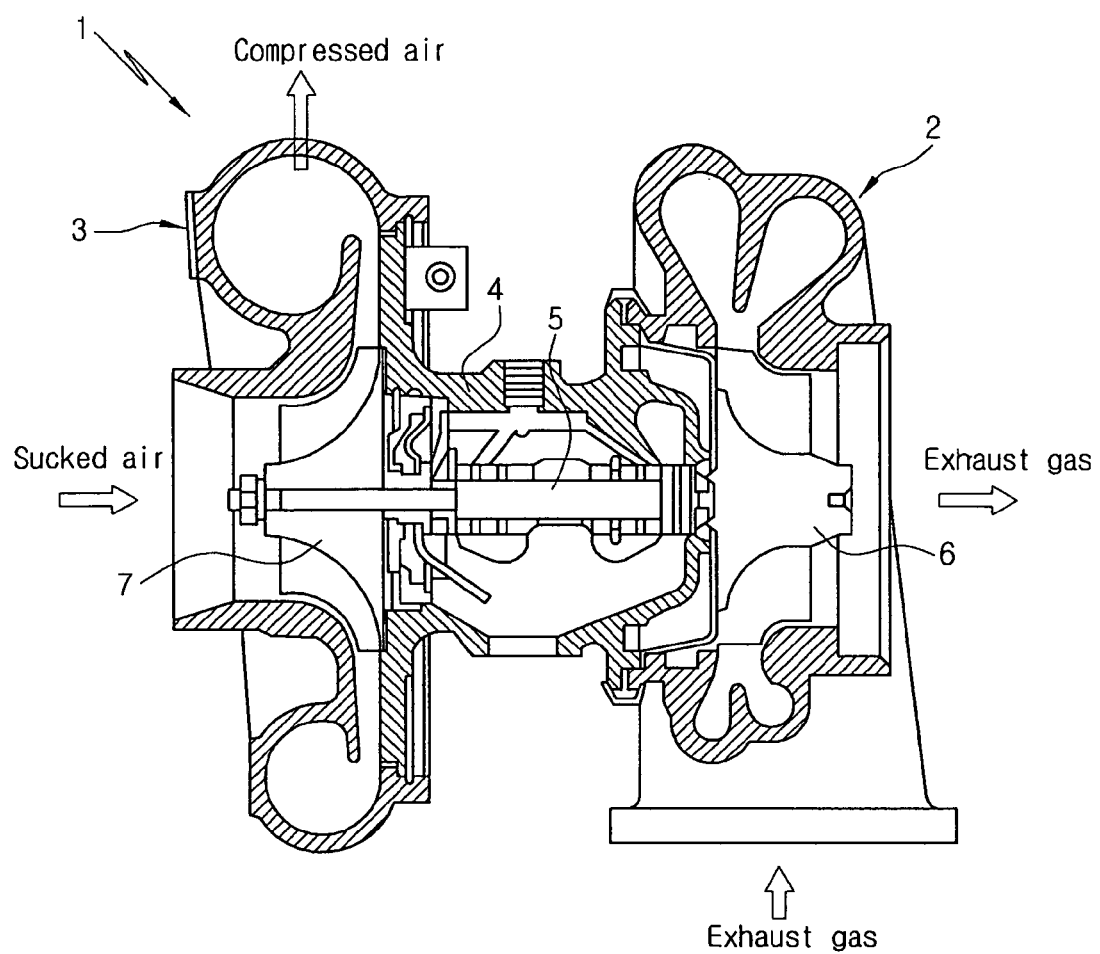
FIG. 1 is a sectional view of an air supply system for general diesel engine vehicles.
Figure 2:
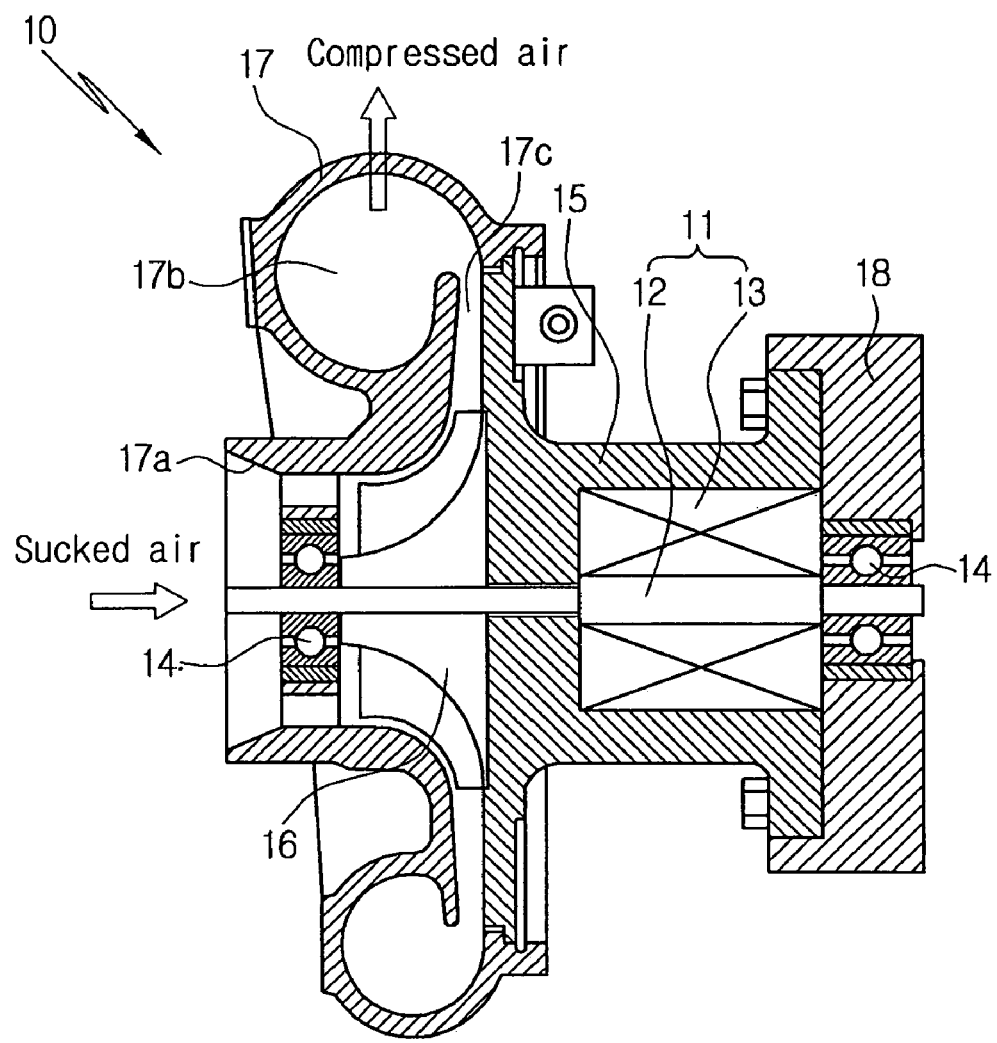
FIG. 2 is a sectional view of an air supply system for fuel cell vehicles according to a prior art.
Figure 3:
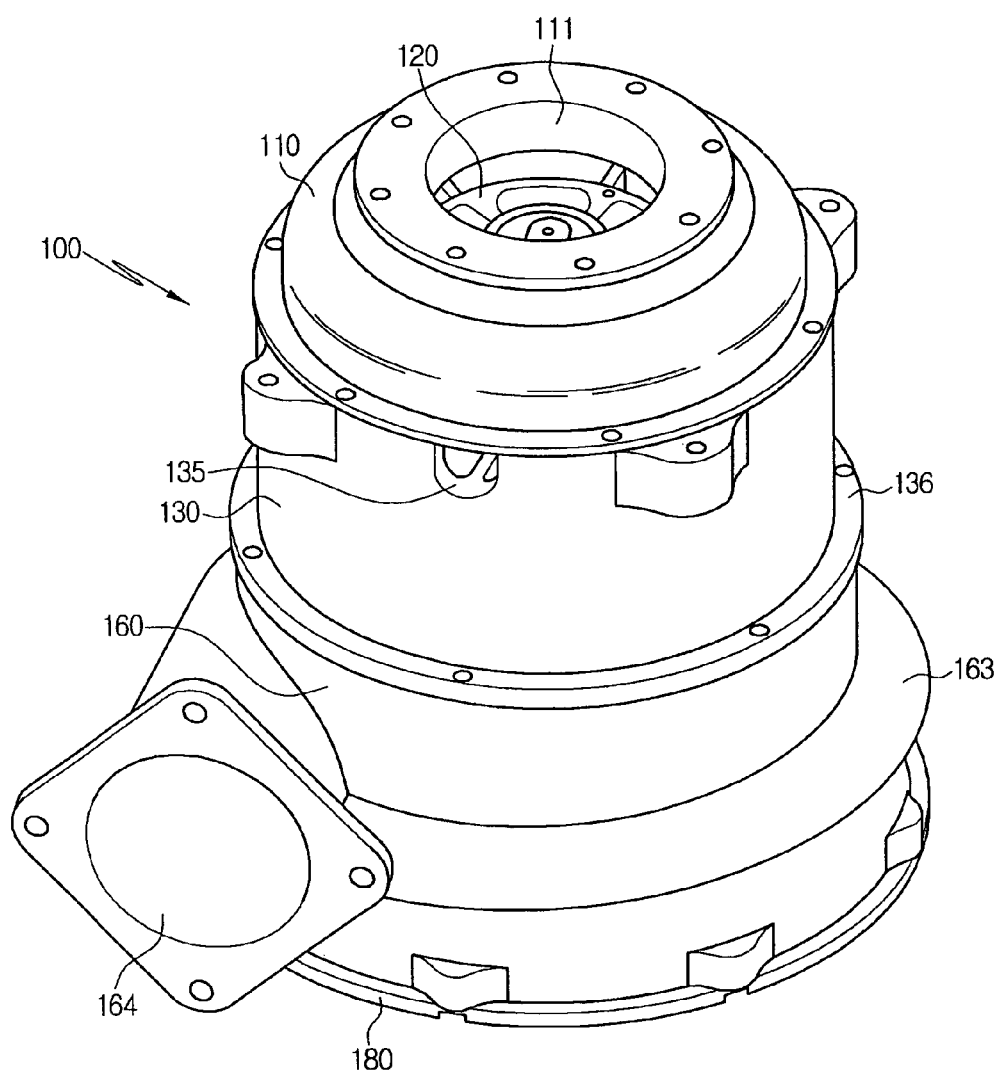
FIG. 3 is a perspective view of an air supply system for vehicles according to the present invention.
Figure 4:
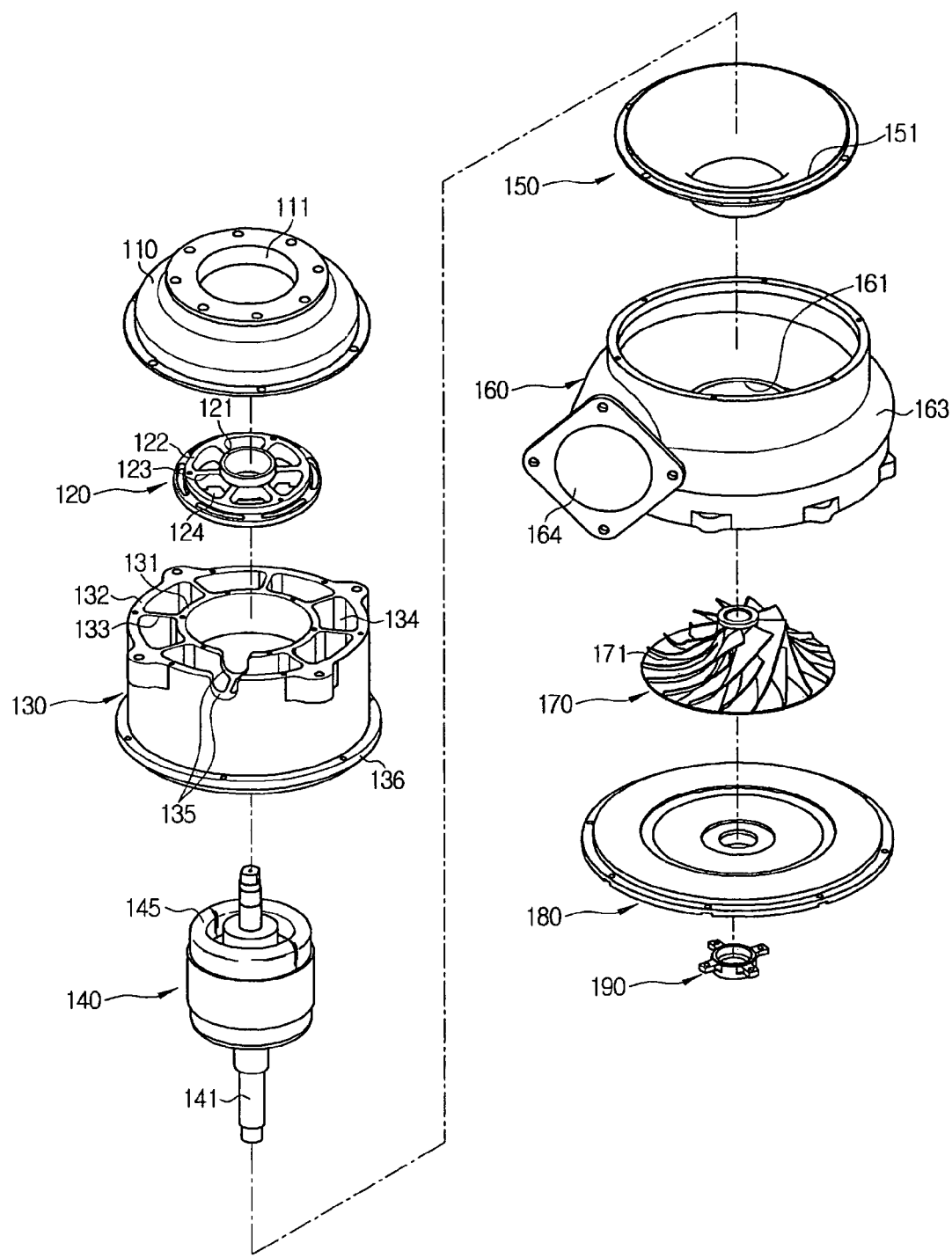
FIG. 4 is an exploded perspective view of the air supply system for vehicles according to the present invention.
Figure 5:
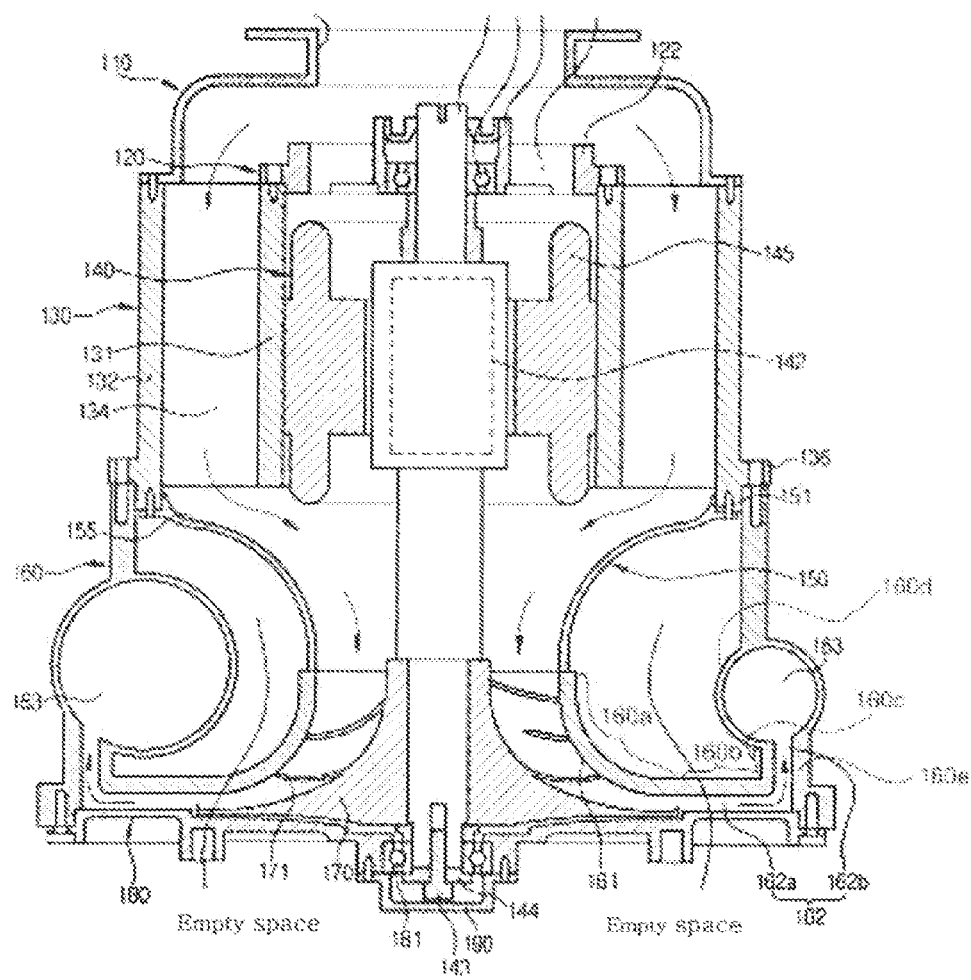
FIG. 5 is a sectional view of the air supply system for the vehicles according to the present invention.
Figure 6:
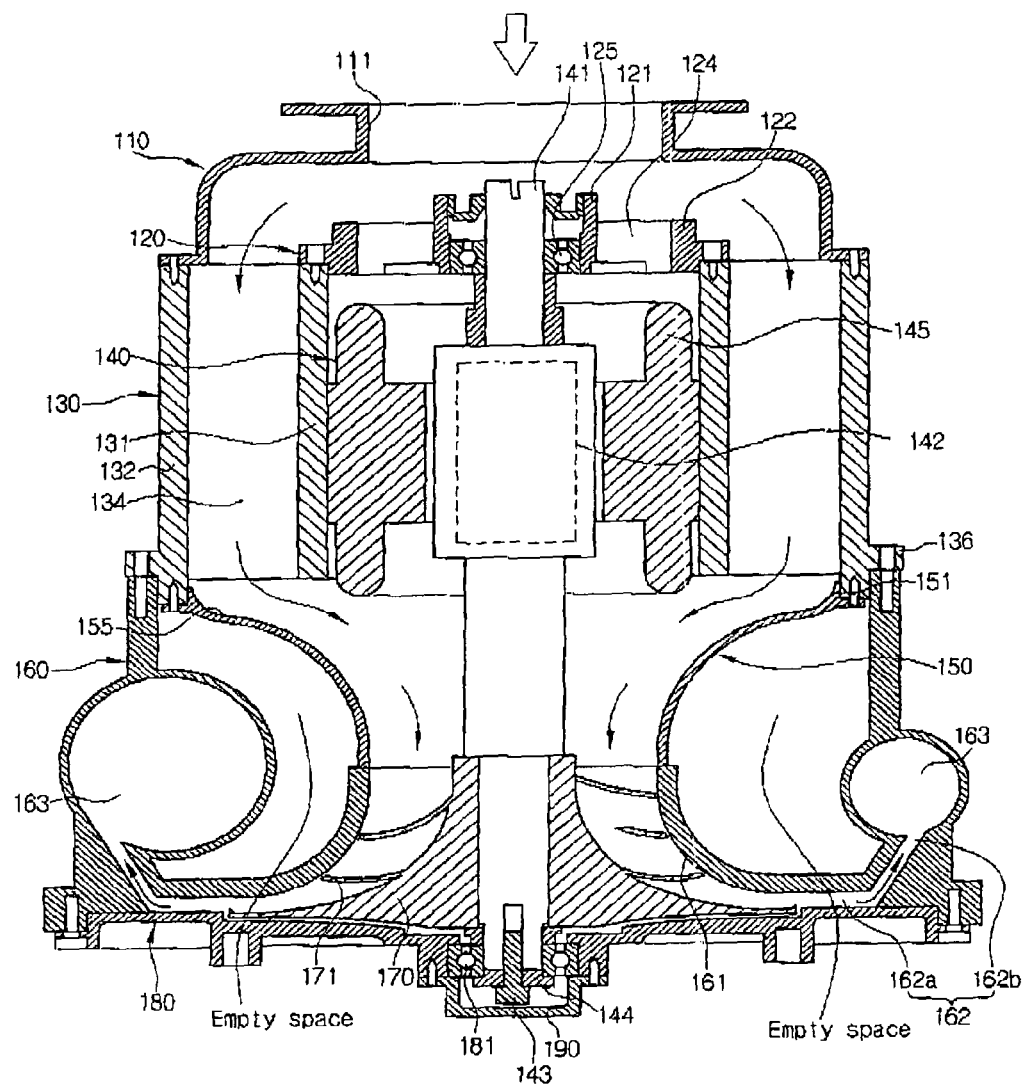
FIG. 6 is a sectional view showing a state where a second passageway of a diffuser passageway of the air supply system is formed inclinedly.

FIG. 3 is a perspective view of an air supply system for vehicles according to the present invention, FIG. 4 is an exploded perspective view of the air supply system for vehicles according to the present invention, FIG. 5 is a sectional view of the air supply system for the vehicles according to the present invention, and FIG. 6 is a sectional view showing a state where a second passageway of a diffuser passageway of the air supply system is formed inclinedly.

As shown in the drawings, the air supply system 100 for the vehicles according to the present invention serves to supply compressed air to a stack of a fuel cell vehicle.

The air supply system 100 includes a motor part 140, a motor housing 130, an inlet duct 110, a bearing holder 120, impeller 170, outlet duct 160, and end plate 180.

First, the motor part 140 is inserted and mounted into the center of the motor housing 130, and rotates a rotary shaft 141 mounted at the center thereof.

The motor part 140 includes a magnet 142 mounted inside the rotary shaft 141, and a stator 145 mounted on the periphery of the rotary shaft 141 at fixed intervals in a radial direction of the rotary shaft 141.

Here, the stator 145 is known previously to those skilled, and constructed in such a way that a coil is wound on a stator core assembly. So, when electricity is applied to the stator 145, the rotary shaft 141 is rotated.

In addition, the motor housing 130, to which the motor part 140 is vertically inserted and mounted, includes an air flow channel 134 vertically formed in the outward periphery of the motor part 140.

That is, the motor housing 130 includes: an inner cylinder 131 adapted for inserting and mounting the motor part 140 thereto; an outer cylinder 132 located on the same axis and having a diameter larger than that of the inner cylinder 131; and a number of radiation fins 133 for integrally connecting the inner cylinder 131 and the outer cylinder 132 with each other. Furthermore, the air flow channel 134 is vertically formed between the inner cylinder 131 and the outer cylinder 132 to allow the air introduced through the inlet duct 110 to flow toward the outlet duct 160.

The air flow channel 134 is partitioned by a number of the radiation fins 133.

Moreover, the radiation fins 133 receives heat generated from the motor part 140 and heat-exchanges with the air passing through the air flow channel 134 to thereby cool the motor part 140.

In the meantime, the motor housing 130 further includes a mounting groove 135 for passing an electric wire therethrough to supply electricity to the motor part 140 mounted inside the inner cylinder 131.

In addition, the motor housing 130 has a flange 136 protrudingly formed on the outer peripheral surface of the lower end thereof and coupled with the upper end of the outlet duct 160 via bolts.

Furthermore, the inlet duct 110 is coupled to the upper end of the outer cylinder 132 of the motor housing 130 via bolts, and has an inlet 111 formed at the center of the upper end thereof for introducing air thereto. The lower end of the inlet duct 110 is opened. So, the inlet duct 110 guides the air introduced through the inlet 111 into the air flow channel of the motor housing 130.

Moreover, the bearing holder 120 is located inside the inlet duct 110 and coupled to the upper end of the inner cylinder 131 of the motor housing 130 via bolts, and has a bearing 125 mounted on the inner peripheral surface thereof to rotatably support the upper end of the rotary shaft 141.

That is, the bearing holder 120 includes: an inner peripheral ring 121 to which the bearing 125 is inserted and mounted; an outer peripheral ring 122 located on the concentricity with the inner peripheral ring 121, having a diameter larger than that of the inner peripheral ring 121, and fixed on the upper end of the inner cylinder 131 of the motor housing 130 via bolts; and a number of stators 123 adapted for integrally connecting the inner peripheral ring 121 and the outer peripheral ring 122 with each other.

In this instance, a passageway 124 adapted for allowing a flow of air is formed between the inner peripheral ring 121 and the outer peripheral ring 122. Some of the air introduced into the inlet duct 110 is supplied to the motor part 140 through the passageway 124 to thereby enhance a cooling effect of the motor part 140 more.

In addition, the impeller 170 is coupled to the lower end of the rotary shaft 141, and rotatably mounted on an impeller receiving portion 161 of the outlet duct 160, which will be described later.

The impeller includes a number of streamlined blades 171 formed on the outer peripheral surface thereof. So, when the impeller 170 is rotated together with the rotary shaft 141, the impeller 170 compresses air while sucking air through the inlet 111 of the inlet duct 110 and blowing the sucked air toward the diffuser passageway 162 formed in the radial direction of the impeller 170.

Furthermore, the upper and lower ends of the outlet duct 160 are all opened. In this instance, the opened upper end is fit and coupled to the outer peripheral surface of the lower end of the motor housing 130 and coupled with the flange 136 of the motor housing 130 via the bolts, and the opened lower end is sealed after the end plate 180 is coupled thereto via bolts.

That is, the outlet duct 160 includes: the impeller receiving portion 161 formed on the inner lower end thereof to rotatably receive the impeller 170 thereto and adapted for communicating with the air flow channel 134 of the motor housing 130; the diffuser passageway 162 having a first passageway 162a extending in a radial direction of the impeller receiving portion 161 to convert kinetic energy of the air blown through the impeller 170 into pressure and passing the converted pressure therethrough and a second passageway 162b extending in an axial direction of the rotary shaft 141 from the first passageway 162a; and a volute 163 communicatingly formed on the upper portion of the diffuser passageway 162 to collect the air compressed while passing through the diffuser passageway 162 and send the collected air toward an outlet 164.

Moreover, the diffuser passageway (162) comprises a first passageway (162a) which is formed between a radially extended wall portion (160b) extending from an end of the receiving wall portion (160a) in a radial direction and the end plate (180), and a second passageway (162b) formed between an upwardly bent wall portion (160c) extending from an end of the radially extended wall portion (160b) in an axial upward direction of the rotary shaft and an outer wall portion (160e) of the outlet duct (160), and the volute (163) is formed on the upper portion of the second passageway (162b). For illustration purposes, structures 160a-160c, 160e, along with 160d (an inner wall portion of the volute) are shown in FIG. 5. Although not specifically labeled by reference numbers, all structures 160a-160e also exist in the drawings of FIGS. 6 and 7.

Here, the inner peripheral surface of the impeller receiving portion 161 is curved along the outer surface of the blades 171 of the impeller 170, and in this instance, compression efficiency can be enhanced as an interval between the inner peripheral surface of the impeller receiving portion 161 and the blades 171 of the impeller 170 is small.

Moreover, the volute 163 is formed on the outer peripheral surface of the outlet duct 160 in a spiral type, has a diameter, which is gradually narrowed toward the outlet 164, and is located on the upper portion of the diffuser passageway 162.

Furthermore, when the impeller 170 is rotated, the air sucked toward the upper portion of the impeller 170 is compressed while passing through the diffuser passageway 162 formed in the radial direction of the impeller 170 and moving toward the volute 163, namely, the kinetic energy obtained while the air passes through the impeller 170 is converted into pressure while the air passes trough the diffuser passageway 162. In this instance, the pressure conversion efficiency is enhanced as the length of the diffuser passageway 162 is long.

So, in the present invention, the diffuser passageway 162 is curved to secure a sufficient length of the diffuser passageway 162 and prevent an increase of the entire size of the system, whereby the pressure conversion efficiency can be enhanced.

That is, it is preferable that an angle formed between the first passageway 162a and the second passageway 162b of the diffuser passageway 162 ranges from 90° to 150°.

In FIG. 5, the second passageway 162b of the diffuser passageway 162 is formed in such a way as to be 90° from an end portion of the first passageway 162a in the upward direction. Then, the sufficient length of the diffuser passageway 162 can be secured to thereby enhance the pressure conversion efficiency, and the volute 163 is formed on the upper portion of the diffuser passageway 162 to thereby prevent an increase in size of the entire system.

In FIG. 6, the second passageway 162b of the diffuser passageway 162 is formed inclinedly from an end portion of the first passageway 162a in the upward direction. That is, the second passageway 162b is formed inclinedly within a range of 90° to 150° from the first passageway 162a. Then, the diffuser passageway 162 can obtain the same effect as FIG. 5, and reduce a flow resistance of the air passing through the diffuser passageway 162 to thereby enhance efficiency of the entire system.

Meantime, in case where the angle formed between the first passageway 162a and the second passageway 162b of the diffuser passageway 162 is smaller than 90°, the flow of the air passing through the diffuser passageway 162 is changed (bent) suddenly, and so, the flow resistance of the air is increased and the efficiency of the entire system is deteriorated. In case where the angle formed between the first passageway 162a and the second passageway 162b of the diffuser passageway 162 is larger than 150°, the flow resistance of the air passing through the diffuser passageway 162 is decreased, but the size of the entire system is increased.

Additionally, the end plate 180 is coupled to the outlet duct 160 via the bolts in such a way as to seal the opened lower end of the outlet duct 160, so that the air sucked into the impeller receiving portion 161 can flow to the diffuser passageway 162 when the impeller 170 is rotated.

In addition, the end plate 180 has a bearing 181 mounted on the inner peripheral surface to rotatably support the lower end of the rotary shaft 141.

A streamlined guide 150 adapted for the air passing through the air flow channel 134 of the motor housing 130 to an air inlet of the impeller 170 is coupled between the motor housing 130 and the impeller receiving portion 161 inside the outlet duct 160.

That is, to introduce the air sucked through the inlet 111 of the inlet duct 110 toward the air inlet of the impeller mounted at the center of the outlet duct after the sucked air flows along the air flow channel 134 formed on the inner periphery of the motor housing 130, the flow channel must be changed suddenly. If the flow channel adapted for connecting an outlet of the air flow channel 134 and the air inlet of the impeller with each other is changed suddenly, efficiency of the system may be deteriorated.

So, to minimize a loss generated when the air passing through the air flow channel 134 of the motor housing 130 is introduced to the air inlet of the impeller 170, the air supply system according to the present invention includes a guide 150 mounted between the motor housing 130 and the impeller receiving portion 150.

That is, the guide 150 has a curved form having an inflection point 155, and so, prevents that a flow direction of the air is curved suddenly.

The inner peripheral surface of the guide 150 is formed in a concave curvature ranging from the upper end thereof to the inflection point 155 and in a convex curvature ranging from the inflection point 155 to the lower end thereof. In this instance, the center of curvature ranging from the upper end to the inflection point 155 is located on the inside of the guide 150, but the center of curvature ranging from the inflection point 155 to the lower end is located on the outside of the guide 150.

Furthermore, in case where the guide 150 is separately manufactured and coupled to the system, a space between the volute 163 and the guide 150 can be in an empty state, whereby weight of the outlet duct 160 can be reduced.

The guide 150 includes a protrusion portion 151 formed on the upper end surface thereof and forcedly fit to the inner peripheral surface of the outer cylinder 132 of the motor housing 130. Moreover, the upper end of the guide 150 is coupled to the lower end of the motor housing 130 via bolts.

In the meantime, a washer 144 and a bolt 143 are coupled to the lower end of the rotary shaft 141 to prevent a separation of the bearing 181 adapted for rotatably supporting the lower end of the rotary shaft 141 mounted at the center of the end plate 180. Additionally, a cover 190 is coupled to the end plate 180 for protecting the bearing 181.

Figure 7:
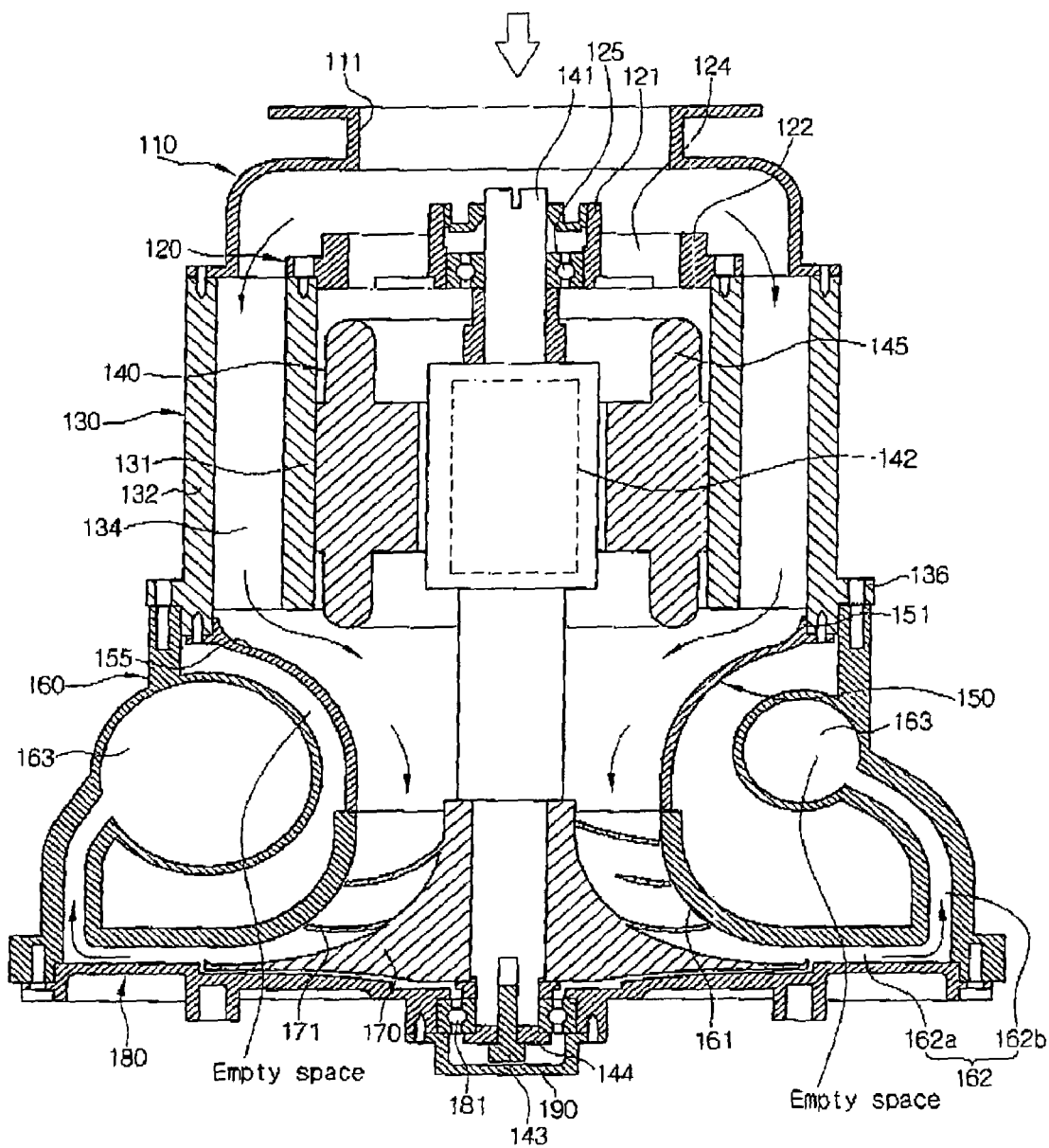
FIG. 7 is a sectional view of an air supply system for vehicles according to another preferred embodiment of the present invention.

FIG. 7 is a sectional view of an air supply system for vehicles according to another preferred embodiment of the present invention. As shown in FIG. 7, the second passageway 162b of the diffuser passageway 162 extends toward the guide 150. That is, the second passageway 162b extends from an end of the first passageway 162a in the axial direction of the rotary shaft 141, and an end portion of the second passageway 162b extends toward the guide 150.

In this instance, the volute 163 is arranged adjacent to the guide 150.

So, the length of the diffuser passageway 162 can be secured sufficiently to thereby enhance the pressure conversion performance and reduce the entire size of the air supply system 100.

In the meantime, in the above, it is described that the second passageway 162b of the diffuser passageway 162 extends toward the guide 150, but the present invention can obtain the same effect also in case where the second passageway 162b extends toward the air inlet of the impeller 170.

Hereinafter, the operation of the air supply system 100 for the vehicles according to the present invention will be described.

First when electric current is supplied to the stator 145, the rotary shaft 141 is rotated, and the impeller 170 coupled to the lower end of the rotary shaft 141 is also rotated.

After that, when the impeller 170 is rotated, air is sucked through the inlet 111 of the inlet duct 110, and in this instance, the sucked air flows along the air flow channel 134 of the motor housing 130.

The air passing through the air flow channel 134 of the motor housing 130 is guided to the guide 150 and introduced toward the air inlet of the impeller 170.

Continuously, the air introduced into the impeller 170 is blown in the radial direction of the impeller 170. In this instance, pressure of the air is increased while the air flows to the volute 163 through the diffuser passageway 162, and then, the air gathered to the volute 163 is discharged through the outlet 164 of the outlet duct 160.

The air having the increased pressure, which is discharged through the outlet 164 of the outlet duct 160, is supplied to the stack.

Meanwhile, in the above, it is described that the inlet duct 110 and the motor housing 130 are coupled with each other via the bolts and the outlet duct 160 and the motor housing 130 are coupled with each other via the bolts, but it would be appreciated that the inlet duct 110 and the motor housing 130 may be formed integrally with each other and the outlet duct 160 and the motor housing 130 may be formed integrally with each other.

As described above, the air supply system according to the present invention can secure the length of the diffuser passageway sufficiently to thereby enhance the pressure conversion performance and reduce the entire size of the system since the diffuser passageway is curved and the volute is formed on the upper portion of the diffuser passageway.

In addition, the air supply system according to the present invention can minimize the loss generated when the air passing through the air flow channel of the motor housing flows toward the air inlet of the impeller and enhance the efficiency of the system since the guide adapted for guiding the air flow toward air inlet of the impeller is mounted as a separate part.

Furthermore, the air supply system according to the present invention can more reduce the entire size of the system since the second passageway of the diffuser passageway extends toward the guide or the air inlet of the impeller and the volute is arranged adjacent to the guide.

Moreover, the air supply system according to the present invention can cool the motor part since the air introduced through the inlet duct passes through the motor housing.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An air supply system for vehicles comprising:
a motor part adapted to rotate a rotary shaft mounted at a center thereof, said motor part having an outer periphery;
a motor housing that is comprised of an inner cylinder and an outer cylinder and adapted to receive the motor part vertically inserted and mounted in the inner cylinder and having an air flow channel vertically formed between the inner cylinder and the outer cylinder on the outer periphery of the motor part;
an inlet duct coupled to an upper end of the motor housing for guiding air introduced through an inlet thereof to the air flow channel of the motor housing;
an impeller coupled to a lower end of the rotary shaft for compressing the air while rotating together with the rotary shaft;
an outlet duct having opened upper and lower ends and coupled to the lower end of the motor housing for compressing the air passing through the air flow channel of the motor housing by the impeller and discharging the compressed air to an outlet thereof and the upper end and the lower end of the outlet duct being opened; and
an end plate coupled to the lower end of the outlet duct in such a way as to seal the opened lower end of the outlet duct,
wherein the outlet duct comprises:
an impeller receiving portion formed on an inner lower end thereof for rotatably receiving the impeller therein and communicating with the air flow channel;
a diffuser passageway adapted for converting kinetic energy of the air blown through the impeller into pressure, and
volute for collecting air compressed while passing through the diffuser passageway and sending the collected air toward the outlet, wherein an inner surface of a receiving wall portion forming the impeller receiving portion is curved along an outer surface of blades of the impeller, wherein the diffuser passageway comprises:

a first passageway which is formed between a radially extended wall portion extending from an end of the receiving wall portion in a radial direction and the end plate; and a second passageway formed between an upwardly bent wall portion extending from an end of the radially extended wall portion in an axial upward direction of the rotary shaft and an outer wall portion of the outlet duct, wherein the volute is communicatingly formed on the upper portion of the second passageway and has a diameter gradually narrowed toward the outlet, and an inner wall portion of the volute is formed separately from the receiving wall portion with a space therebetween, and wherein the outlet duct further comprises a guide for guiding the air through the air flow channel of the motor housing toward the air inlet of the impeller, the guide being formed separately from the impeller receiving portion and the volute and mounted between the motor housing and the impeller receiving portion, wherein one side of the guide is coupled to the end of the outer cylinder and the other side is coupled to the impeller receiving portion inside the outlet duct so that the guide covers the space between the inner wall portion of the volute and the receiving wall portion.

2. The air supply system according to claim 1, wherein the second passageway of the diffuser passageway is formed at an angle of 90° in the upward direction from an end portion of the first passageway.

3. The air supply system according to claim 1, wherein the inner peripheral surface of the guide is formed in a concave curvature ranging from the upper end thereof to an inflection point and in a convex curvature ranging from the inflection point to the lower end thereof.

4. The air supply system according to claim 1, wherein the second passageway of the diffuser passageway extends toward the guide.

5. The air supply system according to claim 1, wherein the second passageway of the diffuser passageway extends toward the air inlet of the impeller.

6. The air supply system according to claim 1, wherein the second passageway of the diffuser passageway is formed inclinedly at an end portion of the first passageway.

7. The air supply system according to claim 1, further comprising a bearing holder coupled to the upper end of the motor housing inside the inlet duct and having a bearing mounted on the inner peripheral surface thereof for rotatably supporting the upper end of the rotary shaft.

8. The air supply system according to claim 1, wherein the end plate has a bearing mounted on the inner peripheral surface thereof for rotatably supporting the lower end of the rotary shaft.

* * * * *